(12) United States Patent
de la Borbolla

(10) Patent No.: US 7,857,275 B2
(45) Date of Patent: Dec. 28, 2010

(54) ADJUSTABLE ELECTRICAL BOX HANGER BAR ASSEMBLY

(75) Inventor: Ian Rubin de la Borbolla, Memphis, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 309 days.

(21) Appl. No.: 12/019,093

(22) Filed: Jan. 24, 2008

(65) Prior Publication Data

US 2008/0179481 A1  Jul. 31, 2008

Related U.S. Application Data

(60) Provisional application No. 60/887,475, filed on Jan. 31, 2007.

(51) Int. Cl.
B42F 13/00 (2006.01)
(52) U.S. Cl. .......................... 248/342; 248/906; 174/58
(58) Field of Classification Search ................. 248/342, 248/343, 906; 174/58, 50, 57, 61, 63; 52/28, 52/39, 10, 713
See application file for complete search history.

(56) References Cited

U.S. PATENT DOCUMENTS

| | | | |
|---|---|---|---|
| 1,133,535 A | 3/1915 | Cain et al. | |
| 1,856,356 A | 5/1932 | Owen | |
| 1,892,286 A | 12/1932 | Nyberg | |
| 1,982,957 A | 12/1934 | Knell | |
| 2,140,861 A | 12/1938 | Steketee | |
| 2,246,189 A | 6/1941 | Rugg et al. | |
| 2,293,168 A | 8/1942 | Pirone | |
| 2,316,389 A | 4/1943 | Atkinson | |
| 2,461,794 A | 2/1949 | Williams | |
| 2,528,418 A | 10/1950 | Buckels | |
| 2,670,919 A | 3/1954 | Esoldi | |
| 2,713,983 A | 7/1955 | Kay | |
| 2,732,162 A | 1/1956 | Mckinley | |
| 2,788,188 A | 4/1957 | Smith et al. | |
| 2,809,002 A | 10/1957 | Rudolph | |
| 2,917,263 A * | 12/1959 | Appleton et al. | 248/217.3 |
| 2,925,236 A | 2/1960 | Cook et al. | |
| 2,930,564 A | 3/1960 | Maier | |
| 2,945,661 A * | 7/1960 | Appleton | 248/57 |
| 2,963,253 A | 12/1960 | Maier et al. | |
| 2,964,279 A | 12/1960 | Galloway | |
| 3,104,087 A | 9/1963 | Budnick et al. | |
| 3,163,386 A | 12/1964 | Collins | |
| 3,214,126 A * | 10/1965 | Roos | 248/318 |
| 3,425,655 A | 2/1969 | Cogdill | |

(Continued)

OTHER PUBLICATIONS

Thomas & Betts Steel City: Metallic Boxes and Covers Catalogue, pp. Al, A14, A17, A18, A38, A39 (2003).

*Primary Examiner*—A. Joseph Wujciak, III
(74) *Attorney, Agent, or Firm*—Hoffmann & Baron, LLP

(57) ABSTRACT

An adjustable hanger bar assembly securable to a support structure including an elongate first member and an elongate second member. The first member is telescopically received within the second member. A securement section is supported on the second member. The securement member captures the first member within the second member and permits relative movement between the first and second members in a direction along a longitudinal axis of the first and second members, and restricts motion between the first and second members in a direction transverse to the longitudinal axis.

8 Claims, 9 Drawing Sheets

U.S. PATENT DOCUMENTS

| | | |
|---|---|---|
| 3,518,421 A | 6/1970 | Cogdill |
| 4,165,851 A | 8/1979 | Bowden, Jr. et al. |
| 4,391,428 A | 7/1983 | Grimes |
| 4,405,111 A | 9/1983 | Lennon |
| 4,463,923 A | 8/1984 | Reiker |
| 4,513,994 A | 4/1985 | Dover et al. |
| 4,518,141 A | 5/1985 | Parkin |
| 4,538,786 A | 9/1985 | Manning |
| 4,659,051 A | 4/1987 | Propp et al. |
| 4,967,990 A | 11/1990 | Rinderer |
| 5,024,412 A | 6/1991 | Hung et al. |
| 5,029,794 A | 7/1991 | Wolfe |
| 5,150,868 A | 9/1992 | Kaden |
| 5,386,959 A | 2/1995 | Laughlin et al. |
| 5,393,026 A | 2/1995 | Deschamps et al. |
| 5,678,799 A | 10/1997 | Jorgensen et al. |
| 5,934,631 A | 8/1999 | Becker et al. |
| 5,938,157 A | 8/1999 | Reiker |
| 5,954,304 A | 9/1999 | Jorgensen |
| 6,033,098 A * | 3/2000 | Hentz et al. .................. 362/430 |
| 6,354,542 B1 | 3/2002 | Meyer et al. |
| 6,491,270 B1 | 12/2002 | Pfaller |
| 6,761,341 B2 | 7/2004 | Pfaller |
| 6,768,071 B1 | 7/2004 | Gretz |
| 6,889,943 B2 * | 5/2005 | Dinh et al. ................... 248/343 |
| 6,967,284 B1 | 11/2005 | Gretz |
| 7,355,118 B1 * | 4/2008 | Gretz ........................... 174/58 |

* cited by examiner

ADJUSTABLE ELECTRICAL BOX HANGER BAR ASSEMBLY

This application claims priority to U.S. provisional application Ser. No. 60/887,475 filed on Jan. 31, 2007, which is incorporated by reference herein in its entirety for all purposes.

FIELD OF INVENTION

The present invention relates generally to an adjustable hanger bar assembly for supporting electrical fixtures. More particularly, the present invention relates to a hanger bar assembly having telescopically engaged members.

BACKGROUND OF THE INVENTION

In order to secure electrical fixtures such as lights and fans in ceilings, a hanger bar device is typically employed. It is very important that a fixture be adequately supported in the ceiling since improper support could lead to the fixture breaking away from the ceiling. Ceilings are typically constructed of structural members including a series of spaced joists which are covered by lathe and plaster or a gypsum wallboard. The ceiling covering material or sheathing is not designed to support loads perpendicular to its surfaces. Therefore, in order to suspend electrical fixtures from a ceiling, the fixture's weight is typically supported by the joists. To achieve this, a fixture may be secured directly to a joist; however, this limits the range of locations where the fixture may be placed. Such a limitation is problematic since it is often desirable to place the fixture in a specific position on the ceiling in order to achieve a desired lighting pattern and/or a pleasing aesthetic. Therefore, if no joist is adjacently positioned to the desired fixture location, direct joist connection is not possible. A preferred solution for supporting electrical fixtures in the ceiling is the use of a hanger bar assembly. A hanger bar allows for the joists to be used for supporting an electrical fixture while still providing flexibility in positioning a fixture.

Hanger bar assemblies typically include extensible telescopic members that are disposed in between the ceiling joists and are securable thereto. An assembly's length, therefore, is adjustable to accommodate various joist spacing distances. Electrical boxes, such as outlet boxes, junction boxes, switch boxes, and the like, are then secured to the transverse members of the hanger bar assembly. Such electrical boxes provide a termination point for electrical wiring as well as an attachment point for the electrical fixture. Typically the electrical box can be positioned at various points along the length of the members in order to properly position the fixture attached thereto. In conventional construction, a cut-out is made in the ceiling covering material in order to provide clearance for the electrical box, thereby allowing the fixture to be secured to the electrical box.

Hanger bar assemblies may be designed to support relatively heavy fixtures and ceiling fans. In order to prevent the load from pulling the assembly from the ceiling, the members forming the assembly are secured to each other to prevent them from separating from each other. The hanger bar assembly typically includes a pair of telescoping channel members with the outer member having inwardly turned edges to keep the members from separating in a direction perpendicular to or transverse to the length of the hanger bar assembly. Such hanger bar assemblies are shown in U.S. Pat. Nos. 5,934,631 and 5,938,157. However, forming the inwardly turned flanges involves additional manufacturing steps and complicates the construction.

Accordingly, it would be desirable to provide a hanger bar assembly capable of supporting differing loads including those of ceiling fans and heavy fixtures that can be efficiently manufactured.

SUMMARY OF THE INVENTION

The present invention pertains to a hanger bar assembly for securing an electrical fixture.

The present invention provides a hanger bar assembly having first and second elongate members telescopically engaged with each other.

The present invention further provides a hanger bar assembly having first and second elongate members telescopically engaged with each other and the second member having a securement section which receives the first member and restricts all but longitudinal movement between the members.

The present invention still further provides an adjustable hanger bar assembly securable to a support structure including an elongate first member and an elongate second member having a top wall and spaced sidewalls depending therefrom. The first member is telescopically received along the second member and movable along a longitudinal axis of the second member. A securement section is supported on the second member and has a portion offset from said top wall and sidewalls. The securement member captures the first member within the second member and permits relative movement between the first and second members in a direction along the longitudinal axis of the second member, and restricts motion between the first and second members in a direction transverse to the longitudinal axis.

The present invention may still further provide an adjustable hanger bar assembly for securing an electrical box to a support structure including an elongate first member having a top wall longitudinally bounded by a pair of opposed sidewalls. An elongate second member has a top wall and spaced sidewalls depending therefrom. The second member receives in slidable engagement the first member, wherein the first member is movable along a longitudinal axis of the second member. The second member includes a first engagement structure offset from the second member top wall and sidewalls. The first member is positionable between the engagement structure and the top and sidewalls of the second member such that relative movement between the first and second members in a direction along the longitudinal axis of the second member is permitted and motion between the first and second members in a direction transverse to the longitudinal axis is restricted.

The present invention also provides a method of manufacturing an adjustable hanger bar assembly comprising the steps of:

forming a first channel member;

forming a second channel member having a top wall and a pair of opposed sidewalls; and processing said top wall and sidewalls to form a longitudinally extending slot in the second channel member.

DETAILED DESCRIPTION OF THE PREFERRED EMBODIMENTS

Figure 1:
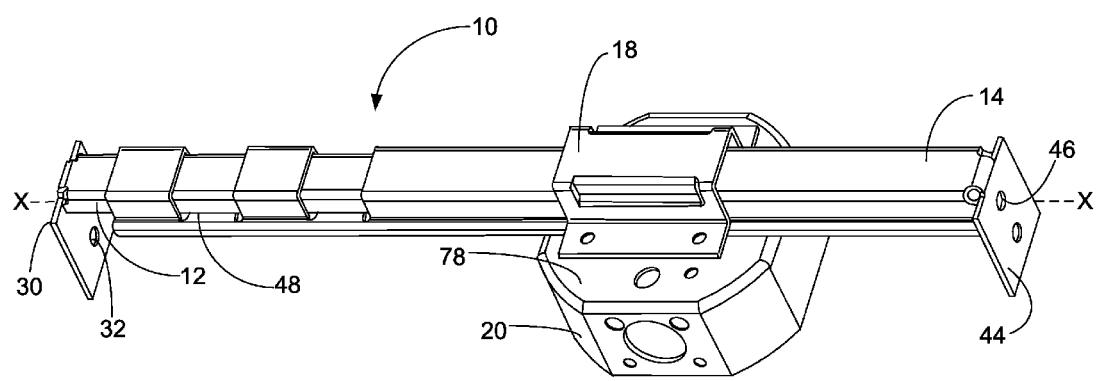
FIG. 1 is a top perspective view of the hanger bar assembly of the present invention.
Figure 2:
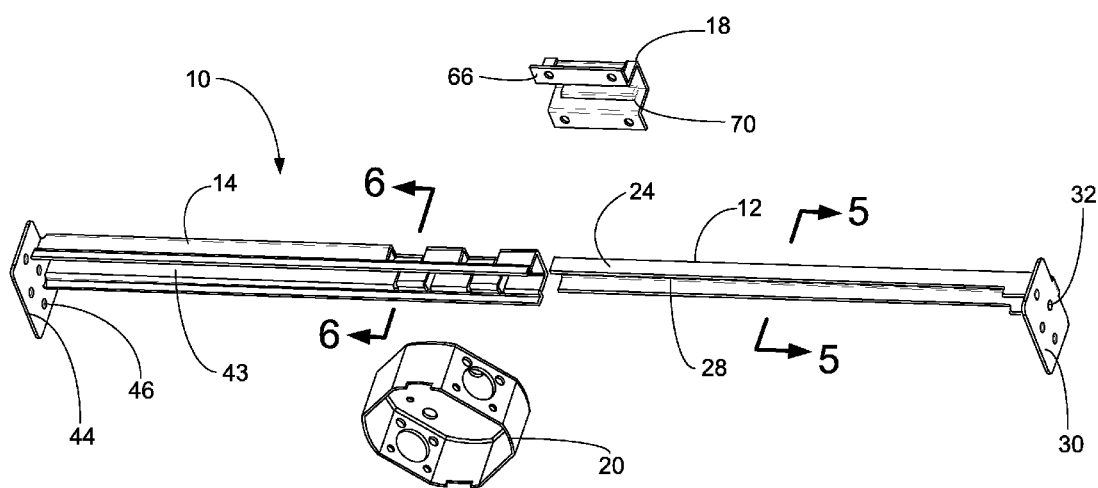
FIG. 2 is an exploded perspective view of the hanger bar assembly of FIG. 1.
Figure 3:
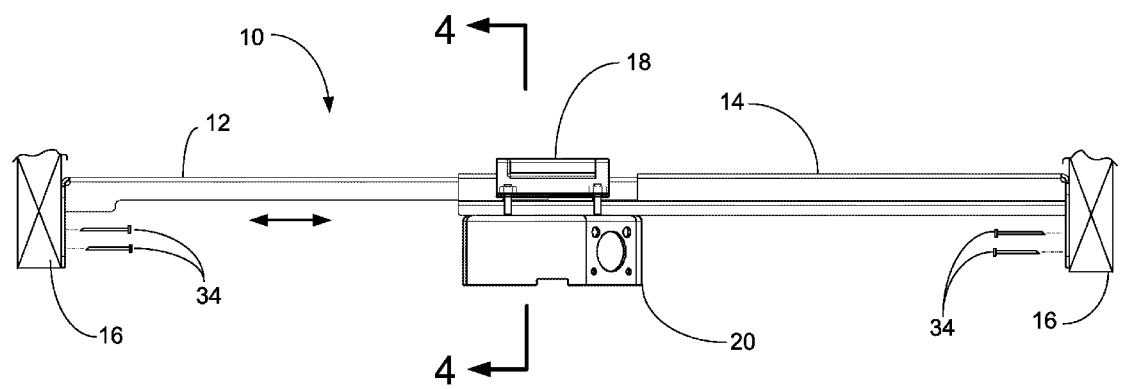
FIG. 3 is a side elevational view of the hanger bar assembly of FIG. 1 secured to a support structure.

Referring to FIGS. 1-3, a hanger bar assembly 10 formed in accordance with a preferred embodiment of the present invention is shown. The hanger bar assembly 10 includes an elongate first member 12 which is telescopically engagable with an elongate second member 14. The first 12 and second 14 members are slidable with respect to each other. This permits the overall length of the assembly 10 to be adjusted so that the assembly may be secured between two support structures 16 such as ceiling joints, wall joists, or other spaced members. The first 12 and second 14 members are preferably dimensioned so that the assembly 10 can be adjusted to fit between the standard 16 inch and 24 inch center-on-center spacing of joists. However, it is within the contemplation of the present invention that the length of the first and second members could be made to accommodate a wide variety of spacings. An electrical box bracket 18 is positioned over the elongate members and provides an attachment for securing an electrical box 20 to the first and second members, 12 and 14. The present invention is particularly suitable for installation in new work applications or where the support structures 16 are exposed, such as when a portion of the ceiling or wall covering is removed.

Figure 4:
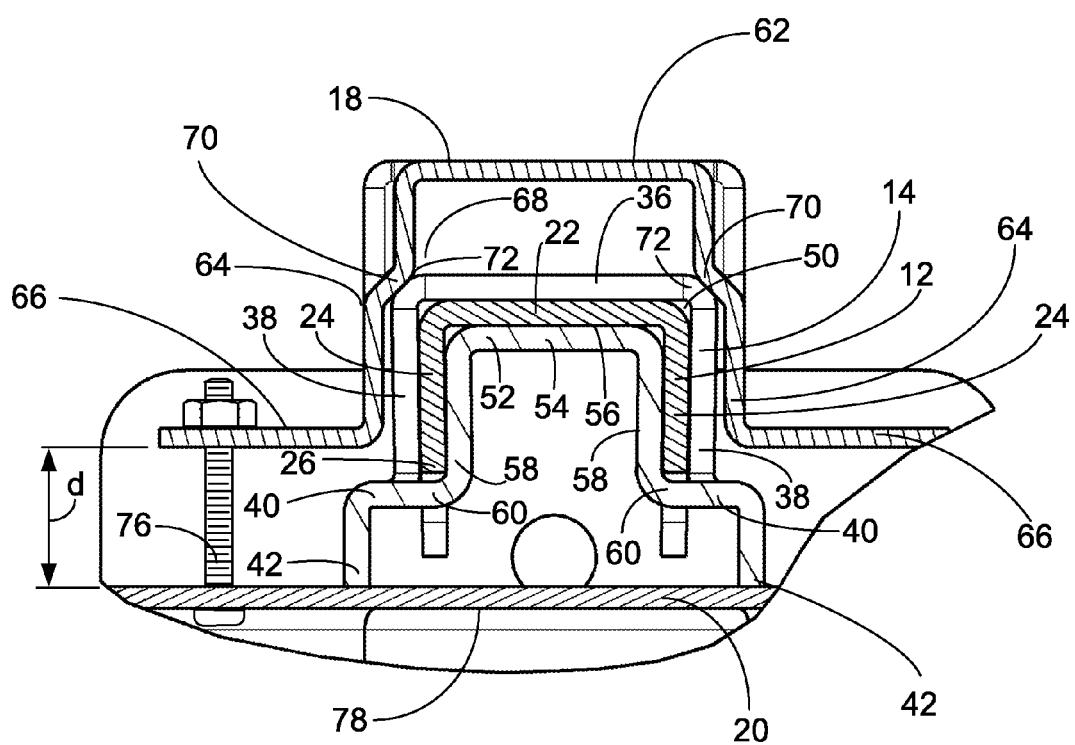
FIG. 4 is a cross-sectional view taken along line 4-4 of FIG. 3.
Figure 5:
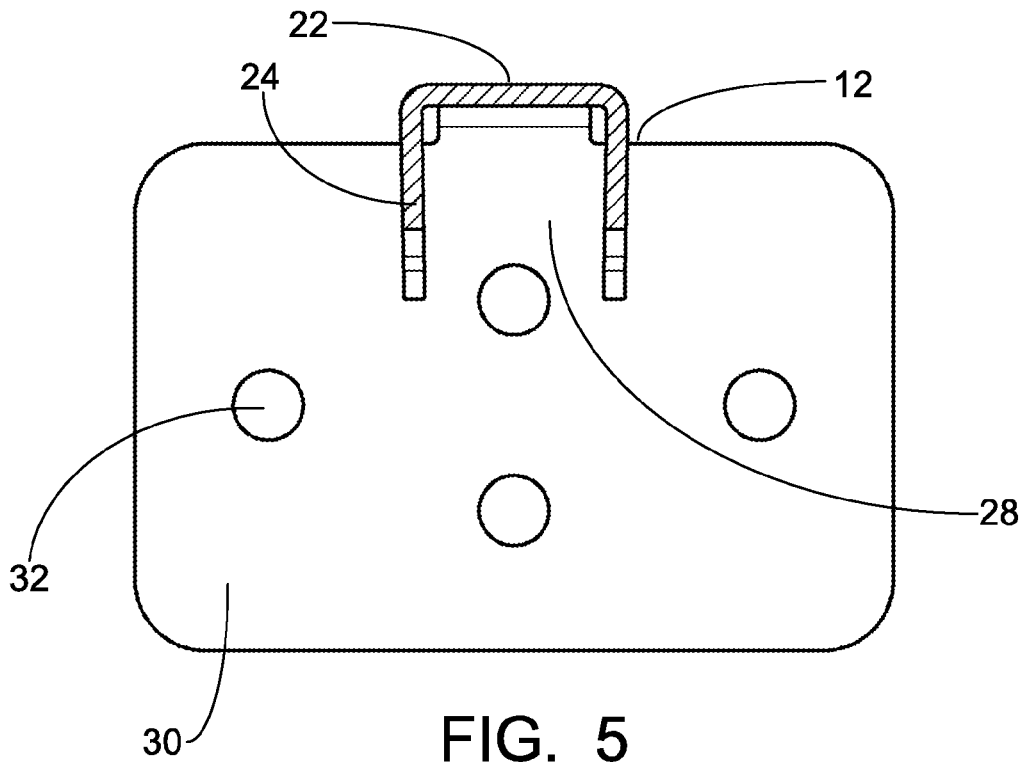
FIG. 5 is a cross-sectional view taken along line 5-5 of FIG. 2.

With additional reference to FIGS. 4 and 5, the first member 12 is in the form of an elongate channel having a generally U-shaped cross-sectional profile. The first member 12 includes a longitudinally extending top wall 22 which is generally flat. The top wall 22 is bounded along its length by outwardly projecting opposed sidewalls 24. The sidewalls 24 are preferably orthogonally extending from the top wall 22 and are generally parallel to each other. The ends 26 of the sidewalls 24 extend in a straight manner and in this embodiment are preferably not turned inwardly or outwardly. The top wall 22 and sidewalls 24 form a longitudinally extending channel 28. One end of the first member may include a mounting plate 30 having one or more holes 32 for receiving fasteners 34, such as screws or nails, in order to permit the first member 12 to be secured to the support structure 16. Protruding barbs (not shown) extending from the mounting plate 30 may also be suitable for securing the first member 12 to the support structure 16. The first member 12 may be formed of a metallic material such as steel.

Figure 6:
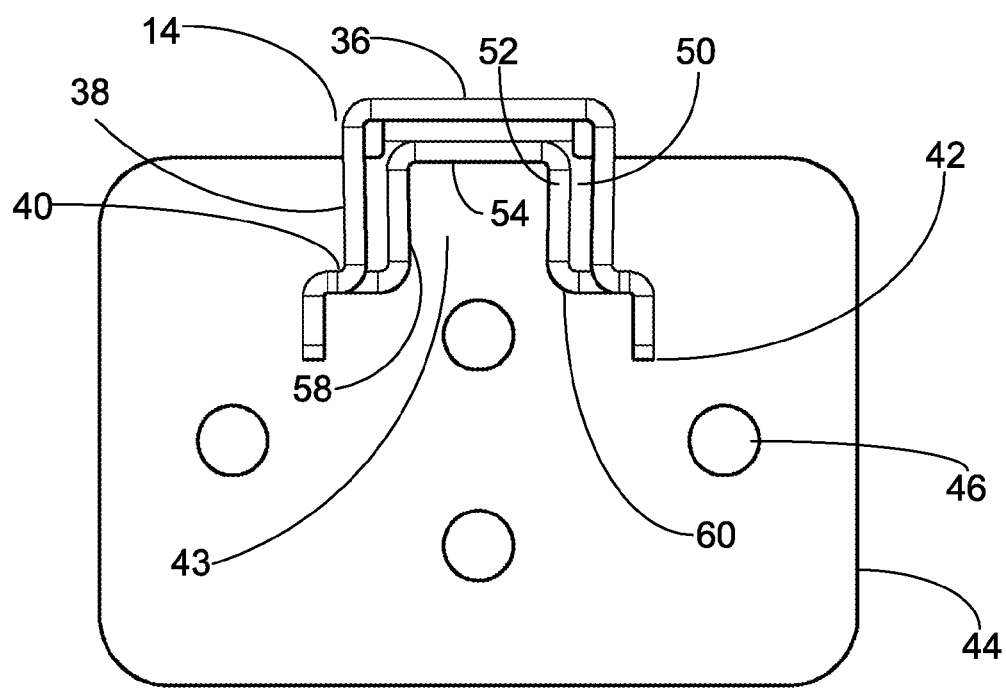
FIG. 6 is a cross-sectional view taken along line 6-6 of FIG. 2.

With specific reference to FIGS. 4 and 6, in the embodiment shown, the second member 14 is in the form of an elongate channel having a generally U-shaped cross-sectional profile. Second member 14 may include a longitudinally extending top wall 36 bounded along its length by two opposed, generally parallel, orthogonally extending sidewalls 38. The sidewalls 38 include a stepped region 40 wherein the sidewall extends outwardly in a transverse direction. Each sidewall then extends in a direction generally orthogonal to the top wall 36 until the sidewall end 42. The ends of the sidewalls 42, may if desired, but preferably do not extend inwardly and are not curved and may be substantially parallel to each other. The top wall 36 and sidewalls 38 form a channel 43 that is configured to receive longitudinally therewithin the first member 12. The second member 14 further includes at one end thereof a mounting plate 44 having one or more holes 46 for receiving fasteners 34 (FIG. 3), in order to permit the second elongate member 14 to be secured to the support structure 16. Alternatively, barbs (not shown) extending from the mounting plate 44 may be used to secure the second member 14 to the support structure 16. The second member 14 may be formed of a metallic material such as steel.

Upon sliding the first member 12 within channel 43 of the second member 14, it is desirable for the members to be slidably secured together such that movement is permitted in a longitudinal direction along the longitudinal axis X-X, and relative motion in various other planes or directions is restricted. To this end, the second member 14 further includes at least one securement section 48. In the preferred embodiment shown in FIGS. 7-9, two longitudinally spaced securement sections 48 are provided. It is within the contemplation of the present invention that additional securement sections may be employed. The securement section 48 engages the first member 12 and restricts its motion relative to the second member 14 such that the first and second members cannot be separated from each other in a direction generally transverse to the longitudinal axis of the first and second members. The securement section 48, however, does permit the first member 12 to be moved longitudinally relative to the second member 14 to permit the length of the hanger bar assembly 10 to be adjusted.

In a preferred embodiment and with further reference to FIGS. 4 and 6, each securement section 48 of member 14 includes a longitudinally extending slot 50 through which the first member 12 may be slid into and along. The slot 50 may be defined by the top wall 36 and sidewalls 38 of the second member 14 and by an engagement structure 52 offset from the top and sidewalls. The engagement structure 52 extends longitudinally over a segment of the length of the second member 14. The engagement structure 52 may include a first portion 54 that engages and supports the undersurface 56 of the first member top wall 22. The engagement structure 52 may also include end walls 58 extending orthogonally from the first portion 54. The end walls 58 may engage the spaced sidewalls 24 of the first member 12. The end walls 58 have ends 60 that are secured to the second member sidewalls 38 at a point adjacent the stepped region 40. The engagement structure 52 may have a generally U-shaped cross-sectional profile complementary to the cross-sectional profile of the first member 12 and configured to permit the first member 12 to slide over and along the engagement structure 52.

When the first member 12 is slid into the slot 50, the first member 12 is captured between the top 36 and sidewalls 38 of the second member and the engagement structure 52. The first member 12 is prevented from separating from the second member 14 in a direction other than along the longitudinal axis, X-X, of the assembly. Separation of the first 12 and second 14 members is achieved by sliding the first member 12 in the longitudinal direction out from the second member 14. The cooperation between the first and second members also restricts relative rotational movement. This cooperation between the first 12 and second 14 members resists separation of the members when they are subjected to a downwardly acting load such as when a fixture is attached.

Figure 7:
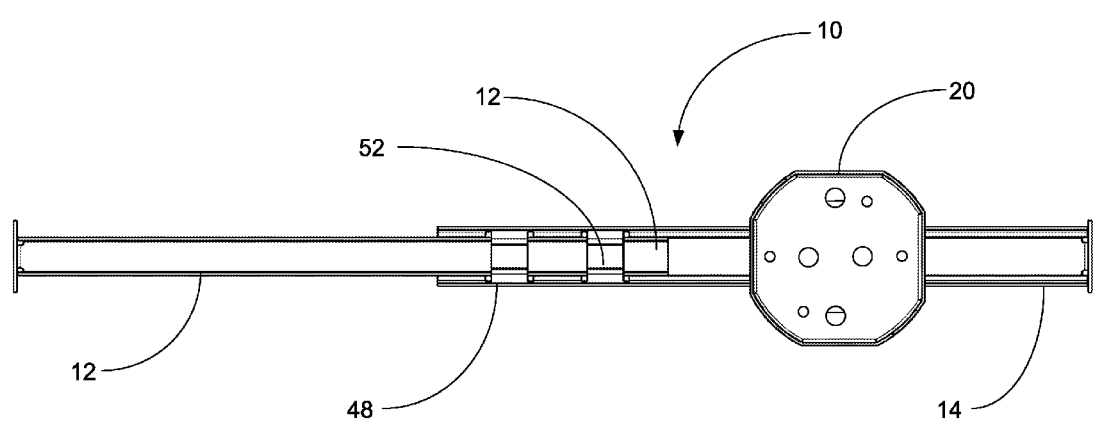
FIG. 7 is a bottom plan view of the hanger bar assembly of the present invention.

As the first member 12 is slid passed the engagement structure 52, it enters into a portion of the second member 14 wherein there is no engagement structure. In the preferred embodiment, further sliding of the first member into the second member brings the first member into engagement with another engagement structure 52 and corresponding slot as shown in FIGS. 1 and 7. Accordingly, the first member 12 is supported in the second member 14 at two areas along its length.

In the preferred embodiment, the engagement structure 52 may be integrally formed with the second member 14. The material forming the second member 14 may include a generally flat piece of material such as steel. The material is then formed, such as by stamping, to create an elongated channel defined by the top wall 36 and sidewalls 38. The generally U-shaped first member 12 may be formed in a similar manner. However, for the second member 14, additional or different processing takes place. A portion of the second member top wall and sidewalls may be processed through a stamping or punching operation to form the engagement structure 52. In order to form the engagement structure 52, a pair of longitudinally spaced grooves may be cut in the top and sidewalls. Through a stamping operation, in the section of the second member between the cut grooves, a portion of the sidewall 38 is extended or forced further inwardly and a portion of the top wall 36 is lowered. The top wall and sidewalls in this section, are therefore, displaced from the profile of the surrounding portions of the second channel generally forming a depression. This creates a gap between the top wall and sidewalls of the engagement structure and the top wall and sidewalls of the second member forming the slot 50 though which the first member 12 may extend. The first member 12 is slidingly secured to the second member without need for processing, such as bending or curving, the sidewall ends and without the need for additional securement components. Accordingly, the hanger bar assembly 10 may be efficiently produced.

Figure 10:
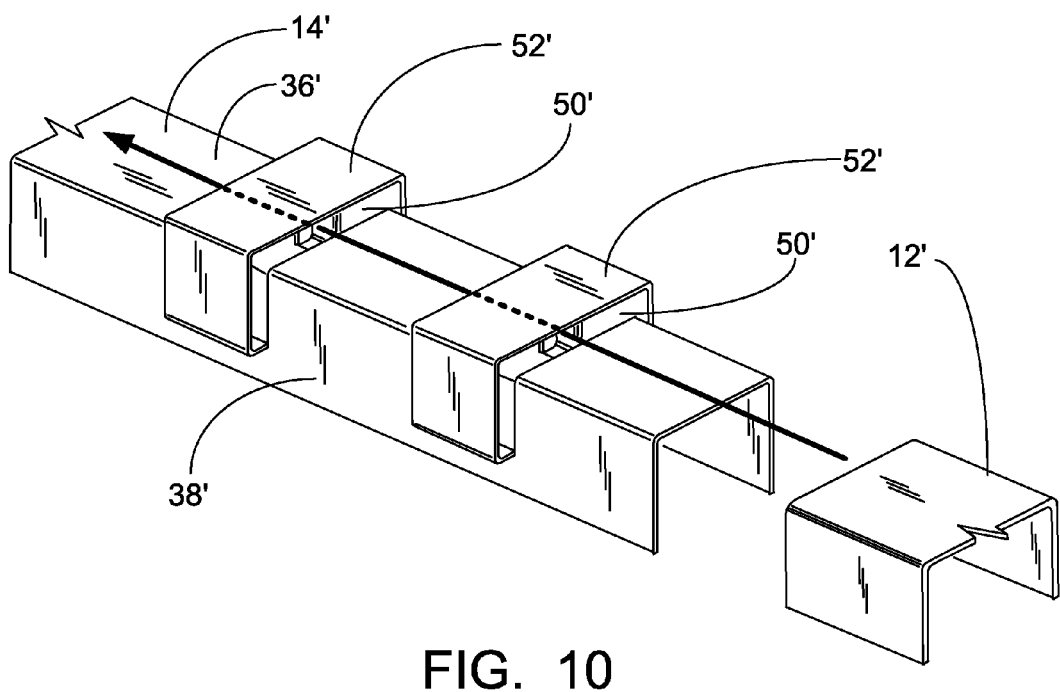
FIG. 10 is a partial top perspective view of an alternative embodiment of the present invention.

In an alternative embodiment shown in FIG. 10, engagement structure 52' may be offset in an opposite outwardly direction from second member 14'. In this alternate embodiment, first member 12' is still slidable between second member 14' and engagement structure 52'; however, the relative dimensions of first and second members 12' and 14' in this alternate embodiment will differ from the embodiment described above. In this embodiment, first member 12' slides over second member 14' and into and through one or more slots 50'. In this embodiment, the engagement structures 52' of the second member 14' may be formed by processing the top wall 36' and sidewalls 38' by deforming a portion of said second member sidewalls 38' outwardly and deforming a portion of said top wall 36' upwardly.

With reference to FIG. 3, when the first member 12 is inserted within the second member 14, the assembly 10 may be mounted between the support structures 16 by way of fasteners 34. The fasteners 34 are extended through the holes 32, 46 (FIG. 1) in the mounting plates 30 and 44. Such attachment restricts movement of the first and second members. This movement may be further restricted by the securement of the electrical box 20 to the members by way of the electrical box bracket 18. As described below, the securing of bracket 18 creates a clamping force that can also restrict the first and second members from moving.

Referring especially to FIGS. 2 and 4, in the preferred embodiment, the bracket 18 may have a top hat-like cross-sectional profile including an upper wall 62 a pair of projecting sidewalls 64 ending in outwardly extending flanges 66. The upper wall 62 and sidewalls 64 form a channel 68 to receive portions of the first 12 and second 14 members therein. The bracket channel 68 is preferably configured to engage the second member 14. The bracket 18 may include longitudinally extending protrusions 70 formed at the corner of the upper and sidewalls. When the bracket is disposed on the second member 14, the protrusions 70 engage the corners 72 of the second member, and the flanges 66 are spaced a distance, d, from the ends 42 of the second member sidewalls.

Figure 8:
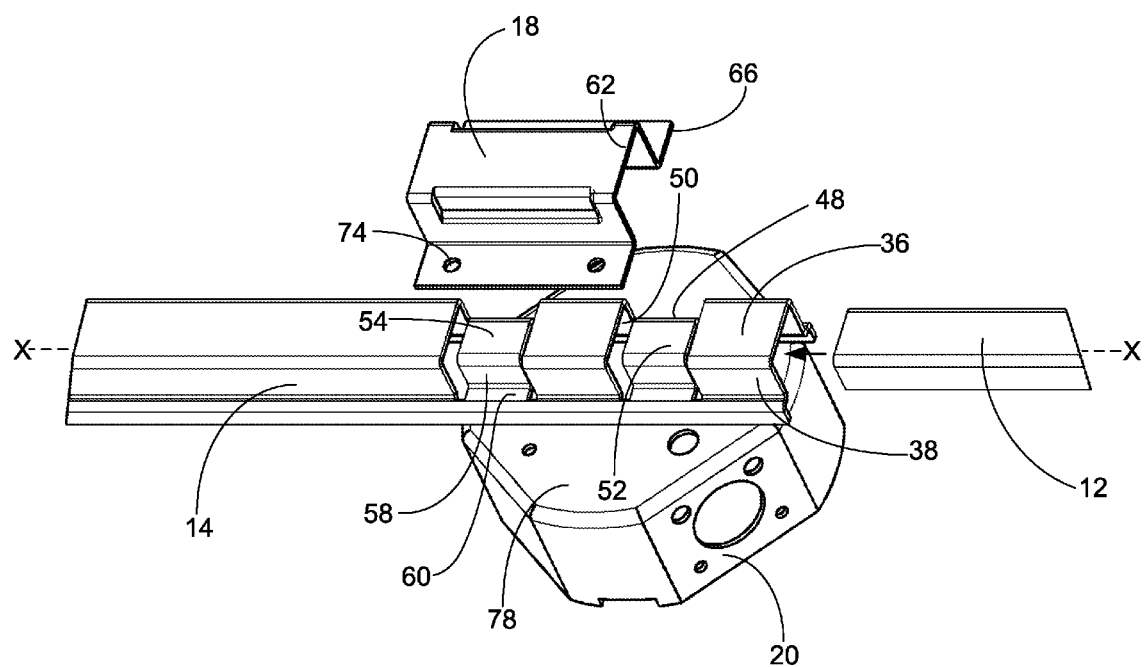
FIG. 8 is a partial top perspective view showing first and second hanger bar members separated from each other.
Figure 9:
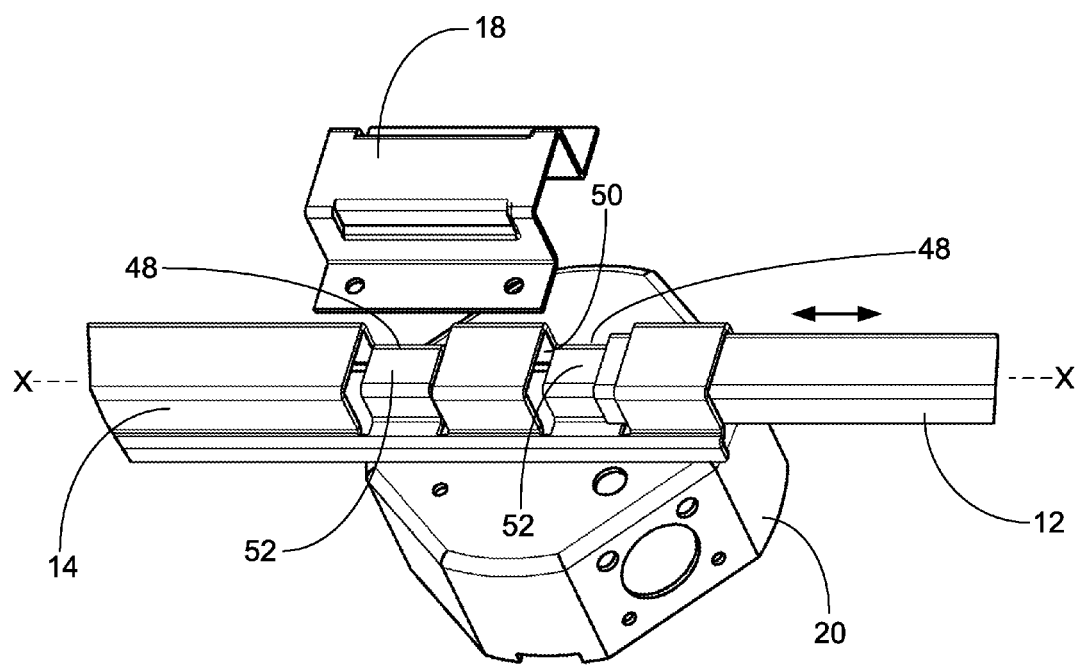
FIG. 9 is a partial top perspective view showing the first and second hanger bar members engaged with each other.

With additional reference to FIG. 8, the electrical box 20 may be secured to the bracket flanges 66. The flanges 66 include holes 74 to receive electrical box fastening hardware 76. The bracket 18 is preferably selectively positioned on a portion of the second member 14 at a location where the first member 12 is inserted within the second member 14. When the bracket 18 and electrical box 20 are positioned together, the ends 42 of the second member sidewalls sit on top of the bottom wall 78 of the electrical box 20. The flanges 66 are spaced the distance, d, from the box bottom wall 78. When the electrical box 20 is secured to the flanges 66, for example by bolts 76, the bracket 18 is pulled toward the electrical box 20, thereby slightly deforming second member 14 and hence urging the overlapping first 12 and second 14 members together. Such a clamping force further restricts movement of the members 12 and 14. Accordingly, when the electrical box is secured, the first and second members are securely held together so that the hanger bar assembly 10 resists the weight of the fixture and remains securely fastened to the support structures 16.

While there have been described what is presently believed to be the preferred embodiments to the invention, those skilled in the art will realize that various changes and modifications may be made to the invention without departing from the scope of the invention, and it is intended to claim all such changes and modifications that fall within the true scope of the invention.

What is claimed is:

1. An adjustable hanger bar assembly securing an electric fixture to a support structure, comprising:
    an elongate first member having a top wall bounded along a length thereof by outwardly projecting sidewalls;
    an elongate second member having a top wall and spaced sidewalls depending therefrom, said first member being telescopically received along the second member and movable along a longitudinal axis of said second member;
    a securement section supported on said second member and having a portion offset from said top wall and sidewalls, wherein said offset portion of said securement section defines a longitudinally extending first slot configured to receive therethrough said first member, said offset portion includes an engagement structure having a configuration complementary to a cross-sectional profile of said first member, said first member top wall engaging and being supported by said engagement structure, and the securement section cooperating with said first member to permit relative movement between said first and second members in a direction along said longitudinal axis of said second member, and to restrict motion between said first and second members in a direction transverse to said longitudinal axis.

2. The assembly as defined in claim 1, wherein said engagement structure is formed of a portion of said second member top wall and sidewalls.

3. The assembly as defined in claim 1, wherein said second member includes a second slot longitudinally spaced from said first slot, and said first member extends into said first and second slots.

4. The assembly as defined in claim 1, wherein said second member sidewalls have ends which are substantially parallel to each other.

5. The assembly as defined in claim 1, wherein said second member sidewalls have ends which do not curve inwardly toward each other.

6. The assembly as defined in claim 1, wherein said first member has a generally U-shaped cross-sectional profile.

7. The assembly as defined in claim 1, wherein said first and second members include distal ends and a mounting plate is secured to each of said distal ends to permit the first and second members to be secured to the support structure.

8. The assembly as defined in claim 1, further including a bracket disposed over said second member and securable to an electrical box, wherein securement of said bracket to the electrical box restricts longitudinal motion between said first and second members.

* * * * *